United States Patent
Noll

(10) Patent No.: US 7,332,190 B2
(45) Date of Patent: Feb. 19, 2008

(54) DEVICE AND METHOD FOR DOUGH PRODUCTION

(76) Inventor: Bernhard Noll, Buttlarstrasse 30, 74541 Vellberg (DE)

( * ) Notice: Subject to any disclaimer, the term of this patent is extended or adjusted under 35 U.S.C. 154(b) by 705 days.

(21) Appl. No.: 10/428,288

(22) Filed: May 2, 2003

(65) Prior Publication Data

US 2004/0022917 A1 Feb. 5, 2004

(30) Foreign Application Priority Data

May 2, 2002 (DE) ................................ 102 19 683

(51) Int. Cl.
*A21D 8/00* (2006.01)

(52) U.S. Cl. ................... 426/504; 426/519; 426/549

(58) Field of Classification Search .............. 426/281, 426/506, 519; 366/76.6, 167.1

See application file for complete search history.

(56) References Cited

U.S. PATENT DOCUMENTS 5,130,569 A * 7/1992 Glica .......................... 327/143
6,319,531 B1 * 11/2001 Aichele et al. ............. 426/506
6,338,867 B1 * 1/2002 Lihotzky-Vaupel ......... 426/557

* cited by examiner

*Primary Examiner*—Lien Tran
(74) *Attorney, Agent, or Firm*—Bachman & LaPointe, P.C.

(57) ABSTRACT

A device for the production of dough from ingredients intended for human consumption as well as from a liquid, water in particular, having a mixing chamber designed to receive and accommodate the ingredients as well as a dough produced from the former wherein conveying means for transporting the ingredients into the mixing chamber are mounted in the mixing unit. Kneading means is provided and includes a nozzle unit for the injection of the liquid into the mixing chamber and the ingredients. The nozzle unit is designed for the injection of the liquid under high pressure to intermixture the ingredients in a mass of dough-like consistency for the production of dough.

5 Claims, 2 Drawing Sheets

DEVICE AND METHOD FOR DOUGH PRODUCTION

BACKGROUND OF THE INVENTION

The present invention relates to a device for dough production and a method of dough production.

Such a device or method specified are generally known from prior art; particularly in connection with large-scale or industrial bread production, kneading of the dough required for the subsequent baking operation.

In concrete terms, in the devices known from prior art, the ingredients—typically flour, yeast, and salt—are kneaded in a mixing chamber together with water to form a dough using mechanical kneading tools; in this regard so-called spiral kneaders or continuously working kneaders are known from prior art.

However, especially in an industrial context—the device for the production of dough has here the character of an industrial manufacturing system—the realisable kneading speed and expenditure of energy required for the kneading operation is of paramount importance; not least in the field of large-scale bakery production, such factors which have an immediate impact on the production costs have proven to be crucial success factors in a competitive market.

If you take a conventional production line with a production capacity of one metric ton of dough per hour for instance, the typical energy requirement of conventional kneading processes is about 16 kWh per metric ton, in more modern, continuous kneading processes it is about 8 kWh. Moreover, the problem arises that for an hourly capacity of about one metric ton, production lines of considerable size are needed, since the actual kneading operation (typically 10 minutes for one batch) is relatively long.

There is a need here for optimization, both with regard to the throughput (i.e. the kneading performance or kneading volume achievable with a production line of a predetermined kneading volume), as well as with regard to the energy expenditure needed per batch of kneaded dough, so that, especially against a background of substitution technologies, the approaches within that product group towards industrial dough production remain competitive.

The object of the present invention is therefore to improve a generic device, both with regard to its processing speed per unit of kneaded dough, as well as with regard to the required energy consumption per unit of kneaded dough.

SUMMARY OF THE INVENTION

The object is achieved by means of the device for the production of dough from flour and a liquid comprising: a mixing chamber; first means for feeding flour to the mixing chambers; and second means for feeding liquid under pressure to the mixing chamber, wherein the liquid mixes with the flour and the liquid and flour are kneaded to form dough. The invention further contemplates a method comprising the steps of feeding the flour into a mixing chamber; and kneading with the liquid to form a dough, wherein the kneading is carried out by injecting the liquid under high pressure into the flour in a mixing chamber.

In a manner which is advantageous in accordance with the present invention and totally abandoning conventional kneading techniques such as mechanical intermixing of the ingredients using spirals, mixing screws, or kneading hooks, water (or other liquid, milk, for instance) is injected into the mixing chamber under high pressure where it thoroughly mixes with the other ingredients already there (the major other ingredient being flour). By virtue of high-pressure injection—a typical injection pressure for the water is in the range of between about 30 and about 100 bar—thorough mixing of the materials comparable to a conventional mechanical kneading process is achieved, with the result that a mass having dough-like state of aggregation is achieved after an injection process relatively short compared to mechanical kneading processes. The said mass can then be fed in the usual way to the subsequent shaping, fermentation, proving, baking, or heating steps.

In a manner which is advantageous in accordance with the invention, above all time expenditure (and thus the necessary absolute energy input) is drastically reduced as compared to the conventional technology. As against a typical prior art kneading-time of about 10 minutes, a comparable effect can now be achieved by the inventive water injection in a treatment time of less than 10 seconds. The resulting advantages regarding capacity utilization (or the size of the production line needed) are obvious. The same applies to the specific energy requirements. Whereas, as described above, a typical amount of energy required per metric ton of kneaded dough is in the range of 8 and 16 kWh, the present invention reduces this energy requirement to about 1.3 kWh.

In the practical realisation, it is particularly preferred that the inventive device be made for a continuous kneading operation. For this purpose, the screw conveyor transporting the ingredients into the mixing chamber is preferably designed in such a way that a continuous dough strand is generated which discharges at the discharge end the already mixed dough (i.e. kneaded according to the invention) quasi continuously through the discharge opening to be provided in a refinement of the invention.

Moreover, it has proven advantageous in a further refinement of the invention to dose air in the form of compressed air into the mixing chamber or into the mixing operation so that the entrapment of air in the dough can be regulated or preset. In accordance with a further refinement of the invention, the nozzle unit is thus additionally provided with a high-pressure nozzle for compressed air.

In the context of the present invention, it is especially important in a further refinement of the invention to provide the mixing chamber with a long, preferably vertically extending casing. In this way, the ingredients, particularly the flour, can enter the unit through an upper inlet and will then be brought together with the liquid for the mixing process by means of a nozzle, preferably a slotted nozzle, provided at the side. The vertical arrangement of the mixing chamber provides—in a particularly suitable manner—for a simple discharge of, the finished dough, so that the necessary discharging is to this extent simplified.

A possible consequence of the short kneading time realisable in accordance with the present invention is that—compared to the relatively long conventional kneading technique—the dough treated in that way has not yet sufficiently developed with regard to its oxidation. A refinement of the present invention therefore provides for this oxidative development being enhanced by other measures such as admixing suitable oxidizing agents (ascorbic acid, ozone, hydrogen peroxide) and/or for the water—which is injected under high pressure anyway in accordance with the invention—being pre-treated ("impregnated") with oxygen. The solubility of oxygen in water is especially increased through the high pressure, so that when it expands the oxygen previously introduced is released relatively quickly, to produce an oxidative effect.

Should it turn out that—in certain production constellations—the high pressure necessary in accordance with the present invention has a detrimental effect on the yeast used as one of the ingredients, it is provided in a further refinement of the invention to supplement the device, which is originally and according to a first embodiment realisable without any additional mechanical kneading unit, with the additional provision of a conventional kneading means (reduced in its performance, however). To this extent, the invention also covers a hybrid realisation between conventional mechanical kneading technology and the injection technology according to the invention which is adapted to the respective production conditions.

The same applies to the possibility embraced by a further refinement of the invention to additionally subject the dough to ultrasonic waves during the kneading process in order to achieve further influence or control regarding the development of the dough during the production process.

While preferred production parameters and ratios are indicated in context with this invention, the present invention is not limited to them, and although a weight ratio of water to ingredients of about 6 to 10 has proven to be particularly suitable in the context of the present invention, the invention is not limited to that.

The result is that the present invention, which in principle consists of a defined flour layer in a mixing container being impacted by water under high pressure, has numerous advantages: As outlined above, both the low specific energy input and the reduced space requirement (achieved by a short treatment time) make it possible to cut costs considerably. The lack of any parts in the dough preparation phase is to a large extent responsible for the trouble-free operation and process stability, and contamination by foreign objects, insects and the like can also be prevented to a large extent.

Particularly in continuous operation, the cleaning requirements can be clearly reduced in comparison to a conventional batch-production with conventional mechanical kneaders, for instance. Furthermore, it is also possible to realise the production process integrated and free from dust in such a manner that there are clear advantages regarding the usual problems known from prior art, baker's asthma, for instance.

Moreover, operation of the machine is also simplified, a fact that leads to a potential reduction in staff costs. Furthermore, less raising agents are needed as this new inventive method provides for an optimised use of said agents.

BRIEF DESCRIPTION OF THE DRAWINGS

Further advantages, features and details of the invention will be apparent from the description hereinafter of preferred embodiments and with reference to the drawings in which.

DETAILED DESCRIPTION

Figure 1:
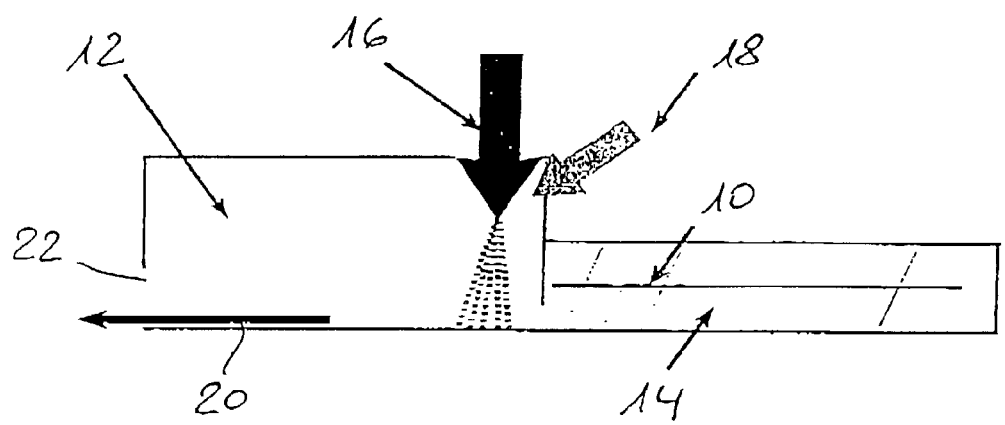
FIG. 1 is a sectional side view (diagram) depicting the fundamental mode of operation of the device for the production of dough in accordance with a first embodiment of the present invention.

The device shown in the diagram of FIG. 1 is operated with a basic recipe as follows: 100 kg of wheat flour type 550, 60 kg of water, 1.2 kg of dry yeast, 2 kg of salt. These ingredients (with the exception of water) are so introduced into the mixing chamber via a screw conveyer 10 as an important part of an upstream conveyor unit 14 that a flat layer of the flour-yeast-salt mixture forms in the mixing chamber. Water will then be injected under high pressure (typically 70 bar) onto this mixture (see vertical thick arrow 16) so that a similar result regarding the intermixture of the water with the dry substances of the ingredients is achieved as in a kneading process. In addition, compressed air is injected under pressure into the mixing chamber 12 by means of additional air inlet nozzles of a nozzle unit (see diagonal arrow 18) so that the entrapment of air into the dough can be adjusted predeterminedly. Along a discharge direction running through a horizontal arrow 20, the kneading mixture thus produced leaves the mixing chamber 12 through a discharge opening 22. The discharge process as in the manner shown is simply carried out by continuously feeding new dry substance to the mixing chamber via the screw conveyer 10.

Figure 2:
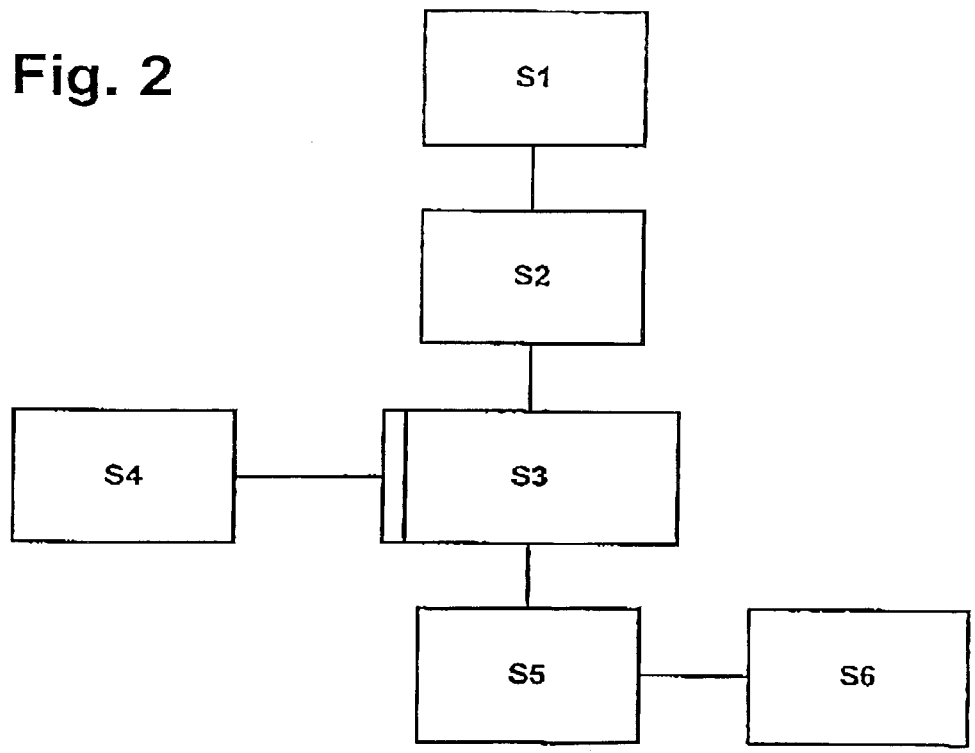
FIG. 2 is a flow-chart depicting important process steps of the method in accordance with an embodiment of the present invention and FIG. 3 is a side view of the present invention in accordance with an alternative second and preferred embodiment with a (chiefly) vertically arranged, long-stretched mixing chamber and a slotted nozzle affixed to the side.

This basic method is also illustrated in the flow-chart of FIG. 2. Ingredients in the form of flour (from a flour silo), salt, starter cultures (yeast, dry yeast, dry leaven intended for sourdough), additional raising agents and optional ingredients, where appropriate, are pre-mixed in dry condition (step S1) and then introduced into the mixing chamber 12 for the mixing process by means of the conveyor unit 14 (step S2). There, the water amount is injected under pressure (step S3), in addition, compressed air is blown in (step S4), so that a dough develops with the desired air-entrapment feature.

This said dough is then discharged (step S5) and further processed to baked goods in the generally known conventional manner, particularly by means of generally known baking processes (step S6).

The procedure described is not limited to the steps or features indicated; in particular, it is possible and also embraced by the present invention to add agents to the water to be injected and/or to the dry substance of the ingredients, agents which are suitable to influence the dough's oxidative behaviour. In this respect, the person skilled in the art will choose suitable aggregates. It is also covered by an alternative refinement of the invention (which is not shown) to treat the dough in container 12 by means of further mechanically effective aggregates (conventional mechanical kneading elements, for instance), and—as an alternative or complement—to subject said dough to ultrasonic treatment in order to solve a possible problem of insufficient oxidative development (which may arise because of the short dwell time).

In the practical realisation, the embodiment of the invention shown in FIG. 1 or FIG. 2 provides for a typical treatment time of about 6 seconds, and the energy requirement for one metric ton of dough will be about 1.3 kWh.

Figure 3:
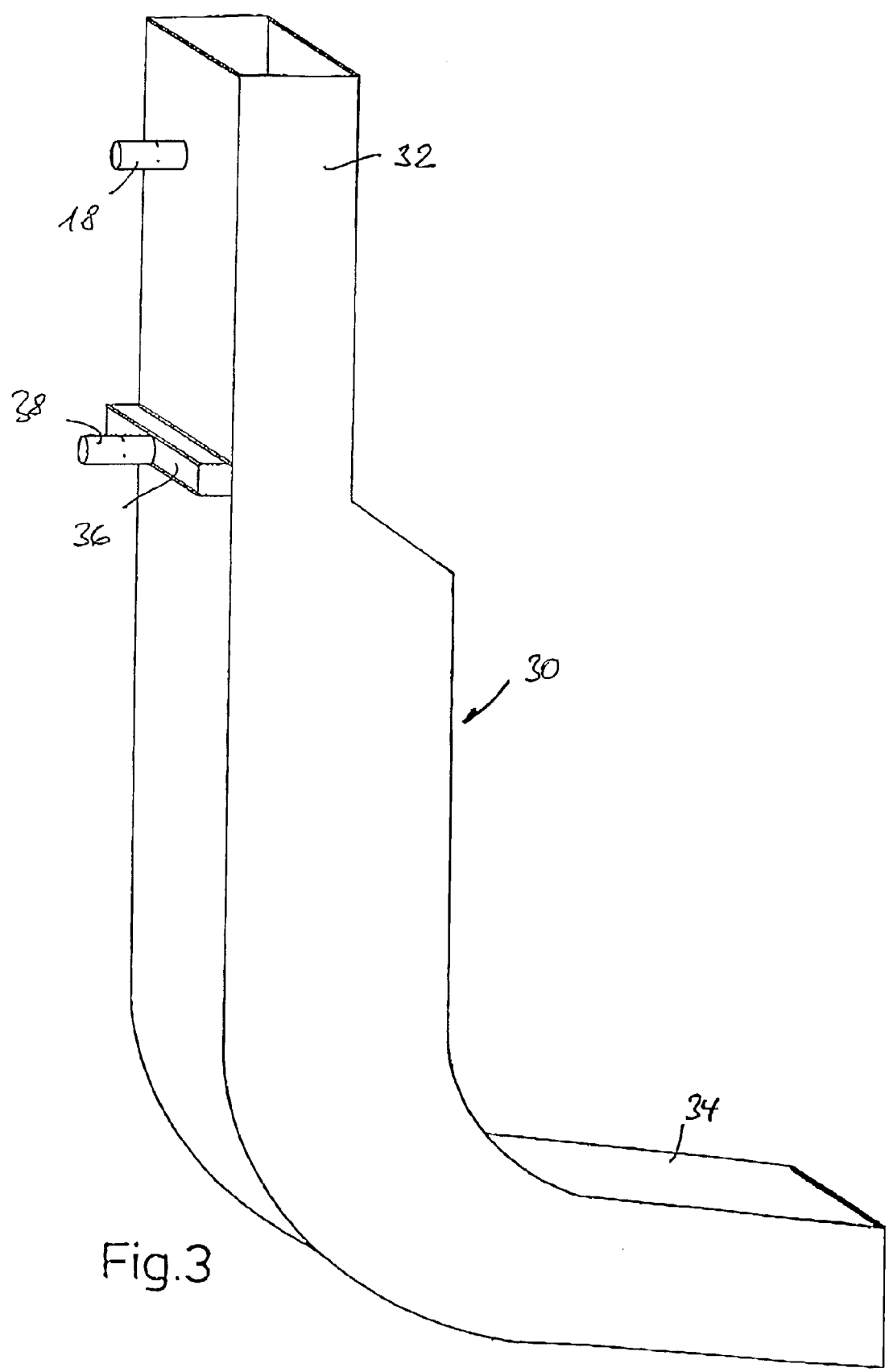

The same applies to the implementation of the invention in accordance with FIG. 3, where a mixing chamber 30 is realised in the form of a long, vertically extending tube with a rectangular cross section which is provided with an inlet section 32 for flour and other ingredients at the upper end of the feed side, and which is bent at the bottom in a horizontally disposed discharge area 34.

The air nozzle 18, already described in connection with FIG. 1, is installed in the inlet section 32, and, where the casing 30 expands, the invention provides for a slotted nozzle 36 extending across the width of the casing. The said slotted nozzle is loaded with pressurised water by means of a pipe connection 38 and will then press the water jet diagonally downwards against the casing across the whole width of the device—typically about 8 cm.

It is an advantageous feature of the embodiment shown in FIG. 3 that—due to its own weight—the dough produced continuously falls downwards and that, consequently, the discharge and thus the movement of the material is considerably simplified by this design. This design can be operated with operation parameters comparable to those indicated above in connection with FIGS. 1 and 2.

What is claimed is:

1. A method for the production of dough made from flour and a liquid, comprising the steps:
   feeding the flour into a mixing chamber; and kneading with the liquid to form a dough, wherein
   the kneading is carried out by injecting the liquid under high pressure of between 30 and 100 bar through a nozzle directed toward an inner wall of the mixing chamber and into the flour in the mixing chamber.

2. A method according to claim 1, including mixing oxidizing agents with at least one of the flour and dough, the oxidizing agents being selected from the group consisting of ascorbic acid, ozone, hydrogen peroxide and mixtures thereof.

3. The method according to claim 1, further including injecting compressed air into the mixing chamber.

4. The method according to claim 1, further including impregnating the liquid with oxygen prior to the injection of the liquid into the mixing chamber.

5. The method according to claim 1, wherein the liquid is injected with a throughput of between 200 and 500 l/h.

* * * * *